(12) United States Patent
Ono et al.

(10) Patent No.: US 11,692,477 B2
(45) Date of Patent: Jul. 4, 2023

(54) ENGINE SYSTEM

(71) Applicant: Mazda Motor Corporation, Hiroshima (JP)

(72) Inventors: Ryohei Ono, Aki-gun (JP); Yuji Harada, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/870,514

(22) Filed: Jul. 21, 2022

(65) Prior Publication Data

US 2023/0029629 A1 Feb. 2, 2023

(30) Foreign Application Priority Data

Jul. 30, 2021 (JP) ................. 2021-125488

(51) Int. Cl.
*F02B 9/02* (2006.01)
*F02B 11/02* (2006.01)
*F02B 19/12* (2006.01)

(52) U.S. Cl.
CPC ............... *F02B 9/02* (2013.01); *F02B 11/02* (2013.01); *F02B 19/12* (2013.01)

(58) Field of Classification Search
CPC ............ F02B 9/02; F02B 11/02; F02B 19/12
USPC ....................................................... 123/260
See application file for complete search history.

(56) References Cited

U.S. PATENT DOCUMENTS

2005/0279321 A1* 12/2005 Crawford ............ F02B 23/0696
123/260
2019/0078498 A1* 3/2019 Bedogni ............. F02B 19/1061

FOREIGN PATENT DOCUMENTS

| CN | 110185534 A | * | 8/2019 | |
| DE | 19927479 A1 | * | 12/1999 | ............... F02B 1/12 |
| EP | 0957245 A2 | * | 11/1999 | |
| JP | 2007255370 A | | 10/2007 | |

* cited by examiner

*Primary Examiner* — Mahmoud Gimie
(74) *Attorney, Agent, or Firm* — Alleman Hall Creasman & Tuttle LLP

(57) ABSTRACT

An engine system is provided, which includes a main combustion chamber, a subchamber, an injector that injects fuel into the main combustion chamber, a main spark plug that ignites a mixture gas inside the main combustion chamber, and a subspark plug that ignites the mixture gas inside the subchamber, an throttle valve, and a control device. In a first range, compression self-ignition combustion of the mixture gas inside the main combustion chamber is performed. In a second range, flame propagation combustion is performed while setting an air-fuel ratio of the mixture gas lower than that in the first range. Immediately after the transition from the first range to the second range, only the subignition is performed, or the subignition and the main ignition are performed while setting a timing of the main ignition to a timing same as or retarded from the subignition.

4 Claims, 9 Drawing Sheets

ENGINE SYSTEM

TECHNICAL FIELD

The present disclosure relates to an engine system provided with a main combustion chamber and a subchamber.

BACKGROUND OF THE DISCLOSURE

Conventionally, in engines mounted on a vehicle, etc., providing a main combustion chamber and a subchamber communicating therewith has been examined, in order to improve fuel efficiency and emission performance. In detail, if the main combustion chamber and the subchamber communicating therewith are provided, and flame generated in the subchamber is blown off to the main combustion chamber, the combustion speed in the main combustion chamber can be increased and fuel efficiency can be improved, and residue of unburnt mixture gas can be reduced and emission performance can be improved.

For example, JP2007-255370A discloses an engine provided with a main combustion chamber (a main chamber in JP2007-255370A) which is defined by a cylinder block, a cylinder head, and a piston, a subchamber communicating with the main combustion chamber, a main fuel injection valve which is provided to an intake port and supplies fuel to the main combustion chamber via the intake port, a main chamber spark plug which ignites a mixture gas inside the main combustion chamber, a sub fuel injection valve which directly injects fuel into the subchamber, and a subchamber spark plug which ignites the mixture gas inside the subchamber. According to this engine, the mixture gas, which is formed inside the main combustion chamber, and is comprised of fuel injected from the main fuel injection valve, and air, is first ignited by the main chamber spark plug, and the mixture gas, which is formed in the subchamber, and is comprised of fuel injected from the sub fuel injection valve, and air, is then ignited by the subchamber spark plug.

As another configuration which improves fuel efficiency of the engine, there is a configuration for making compression self-ignition combustion of the mixture gas. In the compression self-ignition combustion, since the air-fuel ratio of the mixture gas can be increased (leaner) as compared with the flame propagation combustion, an improvement in fuel efficiency becomes possible. Thus, in an engine having the subchamber and the main combustion chamber, if a configuration is adopted in which the mixture gas carries out compression self-ignition combustion in a part of the operating range, and the mixture gas carries out flame propagation combustion by jump spark ignition in the subchamber and the main combustion chamber in a part of the operating range, the engine fuel efficiency is securely improved. However, according to this configuration, a torque shock may occur when shifting to a range where flame propagation combustion is performed from a range where compression self-ignition combustion is performed. In detail, although it is necessary to reduce the air-fuel ratio of the mixture gas during the transition, a decrease in the air-fuel ratio may be delayed because of a delay of intake air, for example. Thus, immediately after the transition, the jump spark ignition is performed in a state where the air-fuel ratio of the mixture gas is comparatively high, and therefore, the suitable flame propagation combustion may not be realized and the engine torque may decrease.

SUMMARY OF THE DISCLOSURE

The present disclosure is made in view of the above situations, and one purpose thereof is to provide an engine system capable of securely improving fuel efficiency while suppressing a torque shock.

According to one aspect of the present disclosure, an engine system is provided, which includes a cylinder block and a cylinder head that form a cylinder, a piston reciprocatably accommodated in the cylinder, a main combustion chamber defined by the cylinder block, the cylinder head, and the piston, a subchamber that is separated from the main combustion chamber by a partition, and communicates with the main combustion chamber through a communicating hole formed in the partition, an injector that injects fuel into the main combustion chamber, a main spark plug that performs a main ignition for igniting a mixture gas inside the main combustion chamber, a subspark plug that performs a subignition for the igniting mixture gas inside the subchamber, an throttle valve that changes an air-fuel ratio of the mixture gas inside the main combustion chamber, and a control device that is electrically connected to, and outputs an electric signal for control to, the injector, the main spark plug, the subspark plug, and the throttle valve. The control device is configured to, in a given first range, suspend the main ignition and the subignition to carry out compression self-ignition combustion of the mixture gas inside the main combustion chamber, and control the throttle valve so that the air-fuel ratio inside the main combustion chamber becomes a given first air-fuel ratio. The control device is configured to, in a second range adjacent to the first range, control at least one of the subspark plug and the main spark plug to perform the ignitions to carry out flame propagation combustion of the mixture gas inside the main combustion chamber, and control the throttle valve so that the air-fuel ratio inside the main combustion chamber becomes a second air-fuel ratio lower than the first air-fuel ratio. The control device is configured to, immediately after the transition from the first range to the second range, control only the subspark plug to perform the subignition, or control the subspark plug and the main spark plug to perform the ignitions and set a timing of the main ignition to a timing same as or retarded from the subignition.

The engine system according to this configuration includes the main combustion chamber, the subchamber, the main spark plug, and the subspark plug so that the combustion of the mixture gas can be carried out both in the main combustion chamber and the subchamber. Thus, in a part of the operating range, the combustion speed in the main combustion chamber can be increased by the flame generated in the subchamber. Further, in this engine system, in a part of the operating range (first range), the compression self-ignition combustion is carried out while controlling the air-fuel ratio of the mixture gas inside the main combustion chamber to be the first air-fuel ratio which is comparatively high (higher than in the second range). Thus, fuel efficiency can be improved securely.

In addition, according to this configuration, immediately after the transition from the first range to the second range, the subignition is carried out, and the main ignition is inhibited or the main ignition timing is set to at or after the subignition timing so as not to perform the main ignition earlier than the subignition. Thus, a torque shock immediately after the transition to the second range can be suppressed. In detail. since the subchamber is separated from the main combustion chamber by the partition, and communicates with the main combustion chamber only via the communicating hole, hot burnt gas is difficult to be discharged from the subchamber, and inside the subchamber is easily kept warm. Therefore, even if the air-fuel ratio is high, the flame propagation combustion of the mixture gas can be carried out securely in the subchamber with the spark discharge by the subspark plug. Therefore, according to this embodiment, when preferentially performing the subignition immediately after the transition from the first range to the second range where the air-fuel ratio is lower than the first range, even in a state where the air-fuel ratio inside the main combustion chamber is not sufficiently lowered immediately after the transition, the flame can be blown off from the subchamber into the main combustion chamber, and with this flame, the flame propagation combustion of the mixture gas inside the main combustion chamber can be carried out. Thus, a decrease in the engine torque can be suppressed.

The control device may control the subspark plug and the main spark plug so that the timing of the subignition is earlier than the timing of the main ignition in a first combustion cycle after the transition from the first range to the second range.

According to this configuration, in the first combustion cycle in the second range, since the main ignition is performed after performing the subignition, the flame is propagated from the subchamber into the main combustion chamber, and ignition energy is added from the main spark plug to the mixture gas inside the main combustion chamber which became hot due to the flame propagation. Therefore, in the first combustion cycle after transitioning to the second range where the air-fuel ratio of the mixture gas is particularly high, the flame propagation combustion of the mixture gas inside the main combustion chamber can be carried out securely.

The control device may control the subspark plug and the main spark plug to perform the main ignition and subignition simultaneously in a second combustion cycle after the transition from the first range to the second range.

According to this configuration, in the second combustion cycle after transitioning to the second range, where the air-fuel ratio of mixture gas is sufficiently low but is not fully decreased, the flame propagation combustion of the mixture gas inside the main combustion chamber can be performed by the flame blown off from the subchamber to the main combustion chamber and the ignition energy of the main spark plug. Further, although, if the subignition and the main ignition which is performed after the subignition are carried out under a state in which the air-fuel ratio is sufficiently lowered, the mixture gas inside the main combustion chamber may combust explosively, the explosive combustion of the mixture gas can be prevented by this configuration.

The control device may control the subspark plug and the main spark plug so that the timing of the subignition is later than the timing of the main ignition in a third combustion cycle and subsequent combustion cycles after the transition from the first range to the second range.

In the third and subsequent combustion cycles in the second range, it is assumed that the air-fuel ratio of the main combustion chamber is lowered to the original air-fuel ratio (second air-fuel ratio). Thus, in the third and subsequent combustion cycles after transitioning to the second range, even when the subignition is performed after performing the main ignition, the mixture gas can combust appropriately inside the main combustion chamber.

The second air-fuel ratio may be set to a value higher than a stoichiometric air-fuel ratio. In the first range, the control device may control the injector so that the fuel injection begins in intake stroke.

According to this configuration, a homogeneous mixture gas with the air-fuel ratio leaner (higher) than the stoichiometric air-fuel ratio carries out the compression self-ignition combustion in the first range, thereby more securely improving fuel efficiency in the second range.

The main spark plug may be attached so that an electrode part thereof is located on an intake port side in a ceiling surface of the main combustion chamber, and the subspark plug may be attached to a position on an exhaust port side in the ceiling surface of the main combustion chamber.

The injector may be disposed so that a tip-end part thereof is located at the center of the ceiling surface of the main combustion chamber.

BRIEF DESCRIPTION OF DRAWINGS

FIG. 10A is a view when the ignition is performed for the first time, FIG. 10B is a view when the ignition is performed for the second time, and FIG. 10C is a view when the ignition is performed for the third time and the subsequent times.

DETAILED DESCRIPTION OF THE DISCLOSURE

Overall Configuration of Engine

Figure 1:
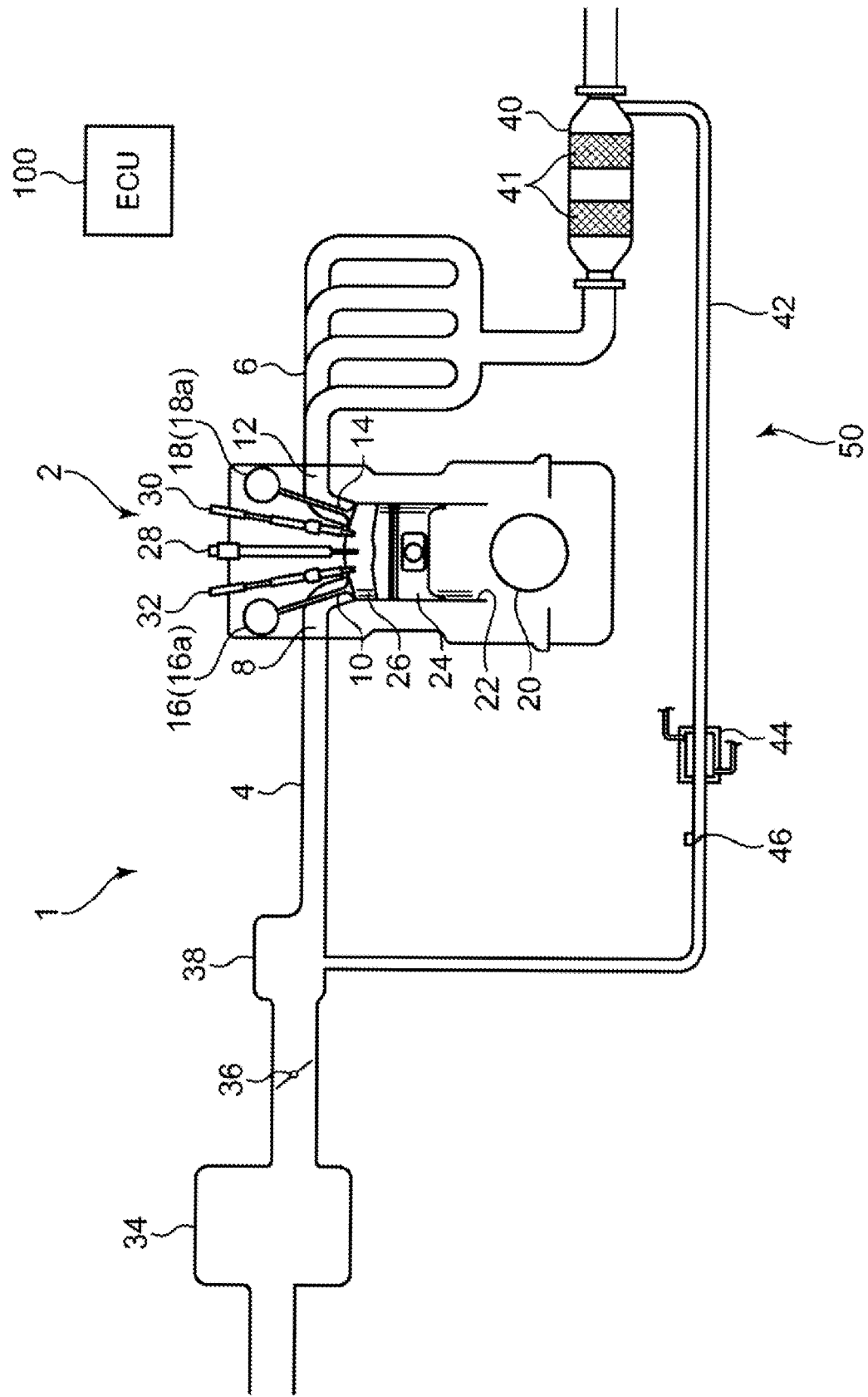
FIG. 1 is an outline block diagram of an engine system according to one embodiment of the present disclosure.

FIG. 1 is an outline block diagram illustrating a desirable embodiment of an engine system of the present disclosure. An engine system 1 includes an engine body 2, an intake passage 4 through which air introduced into the engine body 2 (intake air) circulates, an exhaust passage 6 through which exhaust gas drawn from the engine body 2 circulates, and an exhaust gas recirculation (EGR) device 50. The engine system 1 is mounted on a vehicle, for example, as a power source for propelling the vehicle. The engine body 2 is a four-stroke gasoline engine which mainly uses gasoline as fuel, and fuel containing gasoline is supplied to the engine body 2.

Figure 2:
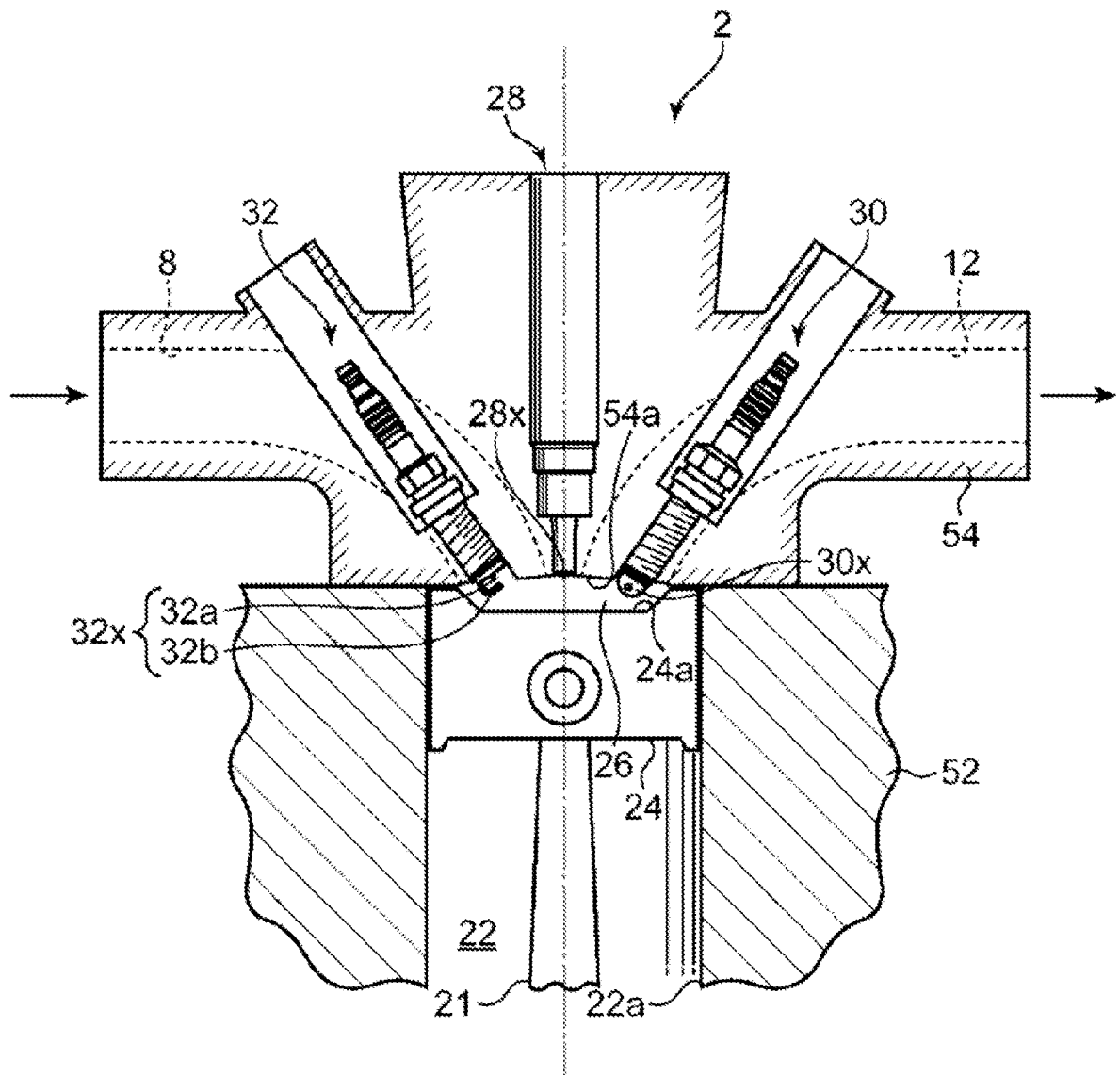
FIG. 2 is an outline cross-sectional view of an engine body.

FIG. 2 is an outline cross-sectional view of the engine body 2. In this embodiment, the engine body 2 is a multi-cylinder engine having a plurality of cylinders 22. For example, the engine body 2 has four cylinders 22 which are lined up single file (lined up in a direction perpendicular to the drawing sheet of FIG. 1). The engine body 2 includes a cylinder block 52 where the plurality of cylinders 22 are formed therein, a cylinder head 54 which has a bottom surface 54a which closes upper-end openings of the cylinders 22 and is attached to an upper surface of the cylinder block 52, and a plurality of pistons 24 reciprocatively accommodated in the respective cylinders 22. Note that although in this embodiment the side which goes toward the cylinder head 54 from the cylinder block 52 is treated as "up" and the opposite side as "down," these expressions are for facilitating the explanation and are not intended to limit the installation posture of the engine.

Main combustion chambers 26 are defined above the pistons 24 of the cylinders 22, respectively. Each main combustion chamber 26 is formed by an inner circumferential surface 22a of the cylinder 22 formed in the cylinder block 52, the bottom surface (lower surface) 54a of the cylinder head 54, and a crown surface 24a of the piston 24. Fuel is supplied to the main combustion chamber 26 by injection from an injector 28 (described later). The piston 24 reciprocates in the up-and-down direction by receiving an expansion force due to combustion of a mixture gas comprised of fuel and air.

A crankshaft 20 which is an output shaft of the engine body 2 is provided to a lower part of the cylinder block 52 (below the piston 24). The crankshaft 20 is coupled to the piston 24 of each cylinder 22 via a connecting rod 21, and rotates on a center axis according to the reciprocating movement of the piston 24.

In the cylinder head 54, an intake port 8 communicating the main combustion chamber 26 with the intake passage 4 to introduce air supplied from the intake passage 4 into the main combustion chamber 26, and an exhaust port 12 communicating the main combustion chamber 26 with the exhaust passage 6 to derive the exhaust gas generated inside the main combustion chamber 26 to the exhaust passage 6 are formed for every cylinder 22. In the cylinder head 54, an intake valve 10 for opening and closing an opening of the intake port 8 on the main combustion chamber 26 side, and an exhaust valve 14 for opening and closing an opening of the exhaust port 12 on the main combustion chamber 26 side are provided for every cylinder 22. In this embodiment, two intake valves 10 and two exhaust valves 14 are provided per cylinder 22.

The intake valve 10 and the exhaust valve 14 are opened and closed in an interlocked manner with the rotation of the crankshaft 20 by valve operating mechanisms 16 and 18 disposed in the cylinder head 54, respectively. In the valve operating mechanism 16 for the intake valves 10, a variable valve lift mechanism (intake S-VT) 16a which electrically and variably controls a valve lift and an opening-and-closing timing of each intake valve 10 is provided. Similarly, in the valve operating mechanism 18 for the exhaust valves 14, a variable valve lift mechanism (exhaust S-VT) 18a which electrically and variably controls a valve lift and an opening-and-closing timing of each exhaust valve 14 is provided.

In the cylinder head 54, the injector 28, a main spark plug 32, and a subignition unit 30 are provided to each cylinder 22, as one set.

The injector 28 is an injection valve which injects fuel into the main combustion chamber 26. An injection port through which fuel is injected is formed in a tip-end part 28x of the injector 28. The injector 28 is attached to the cylinder head 54 so that the tip-end part 28x faces the main combustion chamber 26 from above. In this embodiment, the injector 28 is disposed so that its tip-end part 28x is located at the center of a ceiling surface of the main combustion chamber 26 (in detail, on the axis of the cylinder 22).

The main spark plug 32 carries out a main ignition where ignition is caused by spark discharge to the mixture gas inside the main combustion chamber 26. An electrode part 32x for discharging sparks is provided to a tip end of the main spark plug 32. This electrode part 32x includes a center electrode 32a and a side electrode (ground) 32b. The main spark plug 32 is attached to the cylinder head 54 so that its electrode part 32x faces the main combustion chamber 26 from above. In this embodiment, the main spark plug 32 is disposed so that its electrode part 32x is located on the intake port 8 side with respect to the tip-end part 28x of the injector 28, in the ceiling surface of the main combustion chamber 26.

The subignition unit 30 is a device for discharging flame into the main combustion chamber 26. The details of the subignition unit 30 will be described later.

The intake passage 4 is connected to one of a plurality of side surfaces of the cylinder head 54 so as to communicate with the intake port 8 of each cylinder 22. In the intake passage 4, sequentially from the upstream side, an air cleaner 34, a throttle valve 36, and a surge tank 38 are provided. The air cleaner 34 is a device which removes foreign matter in intake air, and the surge tank 38 is a tank having a given volume. The throttle valve 36 is a valve which opens and closes the intake passage 4 to adjust a flow rate of intake air circulating through the intake passage 4. The throttle valve 36 is configured so that its opening is changed by an actuator which drives the valve. A flow rate of intake air which circulates through the intake passage 4 (i.e., an amount of intake air (air) which flows into the main combustion chamber 26 through the intake passage 4) is adjusted according to the opening of the throttle valve 36. Further, the air-fuel ratio inside the main combustion chamber 26 (a ratio of air weight inside the main combustion chamber 26 with respect to fuel weight inside the main combustion chamber 26) is changed according to the intake air amount change.

A downstream end of the intake passage 4 branches to a plurality of passages. The branch passages are connected to the respective intake ports 8. As for each cylinder 22, a swirl valve 56 (see FIG. 5) is provided to the branch passage coupled to one of the two intake ports 8 to open and close the intake port 8.

The exhaust passage 6 is connected to one of the plurality of side surfaces (the opposite side surface from the intake passage 4) of the cylinder head 54 so as to communicate with the exhaust port 12 of each cylinder 22. In the exhaust passage 6, a catalyst device 40 where a catalyst 41, such as a three-way catalyst, is built therein is provided.

The EGR device 50 is a device for recirculating part of the exhaust gas to the intake passage 4 as EGR gas, and introducing (recirculating) it via the intake passage 4 into the main combustion chamber 26 which communicates with the intake passage 4. The EGR device 50 has an EGR passage 42 which communicates the exhaust passage 6 with the intake passage 4, and an EGR valve 46 and an EGR cooler 44 which are provided to the EGR passage 42. An upstream end of the EGR passage 42 is connected to a downstream end of the catalyst device 40 which is a part of the exhaust passage 6 downstream of the catalyst 41, and a downstream end of the EGR passage 42 is connected to the surge tank 38. The EGR valve 46 is a valve which opens and closes the EGR passage 42 to adjust a flow rate of EGR gas. The EGR cooler 44 is a heat exchanger which cools EGR gas. The EGR cooler 44 is disposed upstream of the EGR valve 46.

Subignition Unit

Figure 3:
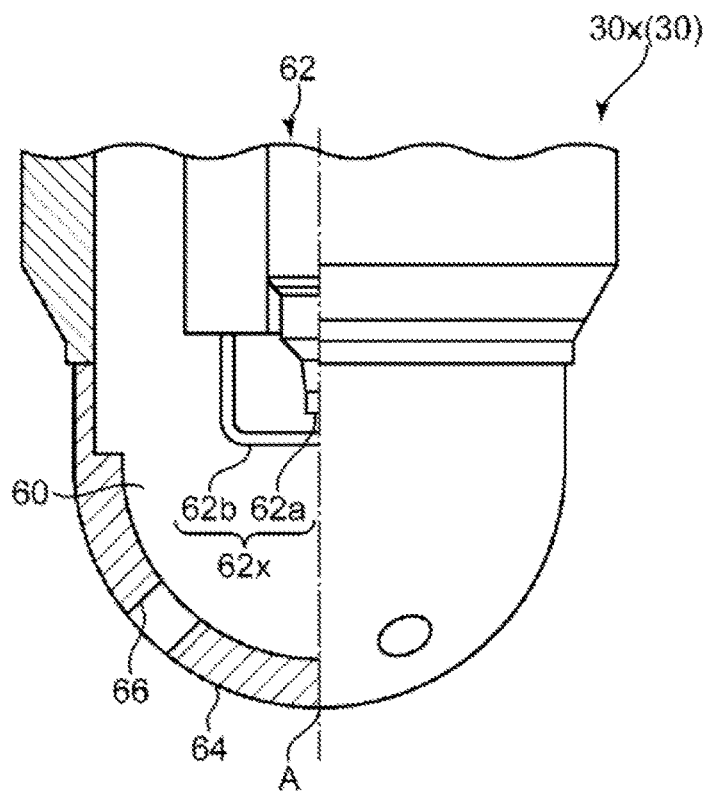
FIG. 3 is a partial cross-sectional view of a tip-end part of a subignition unit when seen from the side.
Figure 4:
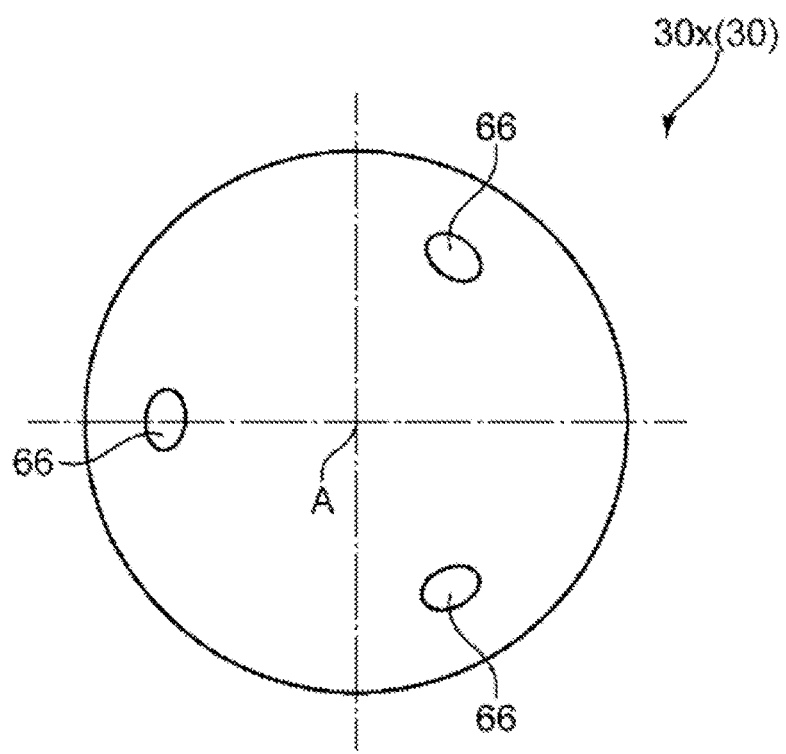
FIG. 4 is a plan view of the tip-end part of the subignition unit.

FIG. 3 is a partial cross-sectional view of a tip-end part 30x of the subignition unit 30 when seen from the side. FIG. 4 is a plan view of the tip-end part 30x of the subignition unit 30 (when seen from the tip-end side).

The subignition unit 30 has a subspark plug 62 which ignites the mixture gas by spark discharge. An electrode part 62x for discharging sparks is provided to a tip end of the subspark plug 62. The electrode part 62x includes a center electrode 62a and a side electrode (ground) 62b. The subignition unit 30 is provided with a cover member 64 which is provided to the tip-end part 30x and covers the electrode part 62x of the subspark plug 62. A subchamber 60 which is a given space is defined inside the cover member 64. In other words, the subspark plug 62 is disposed so that its electrode part 62x faces the subchamber 60, and carries out a subignition which ignites mixture gas inside the subchamber 60. The cover member 64 has a hollow semi-spherical shape which bulges to the tip-end side of the subignition unit 30. The cover member 64 is an example of a "partition" of the present disclosure.

As illustrated in FIG. 2, the subignition unit 30 is attached to the cylinder head 54 so that its tip-end part 30x faces the main combustion chamber 26 from above. In this embodiment, the subignition unit 30 is attached to a position of the ceiling surface of the main combustion chamber 26, on the exhaust port 12 side with respect to the injector 28. In this embodiment, in this attached state, substantially the entire cover member 64 is located inside the main combustion chamber 26.

A plurality of communicating holes 66 are formed in the cover member 64, which penetrate the cover member 64 to communicate the main combustion chamber 26 with the subchamber 60. An inside space of the cover member 64 (i.e., subchamber 60) communicates with the main combustion chamber 26 via these communicating holes 66. Thus, in this embodiment, by attaching the thus-configured subignition unit 30 to the engine body 2, the subchamber 60 is formed in the engine body 2 so that it is divided from the main combustion chamber 26 by the cover member 64, and it communicates with the main combustion chamber 26 via the communicating holes 66.

In this embodiment, three communicating holes 66 are formed in the cover member 64. As illustrated in FIG. 4, the three communicating holes 66 are formed around the axis of the cover member 64 which passes through a vertex A of the cover member 64, at intervals of 120°. Further, as illustrated in FIG. 3, each communicating hole 66 is formed, in a side view, at a position of 45° from the vertex A. Moreover, the radius and the thickness of the cover member 64 are 5 mm and 1 mm, respectively, and the diameter of each communicating hole 66 is 1.2 mm.

The subignition unit 30 injects flame into the main combustion chamber 26. In detail, when fuel is injected into the main combustion chamber 26 from the injector 28 and the mixture gas of air and fuel is formed inside the main combustion chamber 26, a part of the mixture gas is introduced into the subchamber 60 via the communicating holes 66. When the spark discharge is performed by the subspark plug 62 in a state where a sufficient amount of the mixture gas exists inside the subchamber 60, the mixture gas starts combustion inside the subchamber 60, and flame propagates from near the electrode part 62x of the subspark plug 62 to the circumference. Then, this flame is discharged/ejected to the main combustion chamber 26 via the communicating holes 66, and propagates to the mixture gas inside the main combustion chamber 26.

Here, as described above, when the ignition by the main spark plug 32 is performed, the flame also propagates to the circumference from near the electrode part 32x of the main spark plug 32. Thus, if ignition is performed by both the main spark plug 32 and the subspark plug 62, and the mixture gas combust appropriately inside the main combustion chamber 26 and the subchamber 60, the flame will propagate to the mixture gas inside the main combustion chamber 26 from a plurality of positions. Therefore, the combustion speed of the mixture gas inside the main combustion chamber 26 is increased and fuel efficiency is improved, and generation of knocking and residue of unburnt mixture gas are suppressed.

Control System

Figure 5:
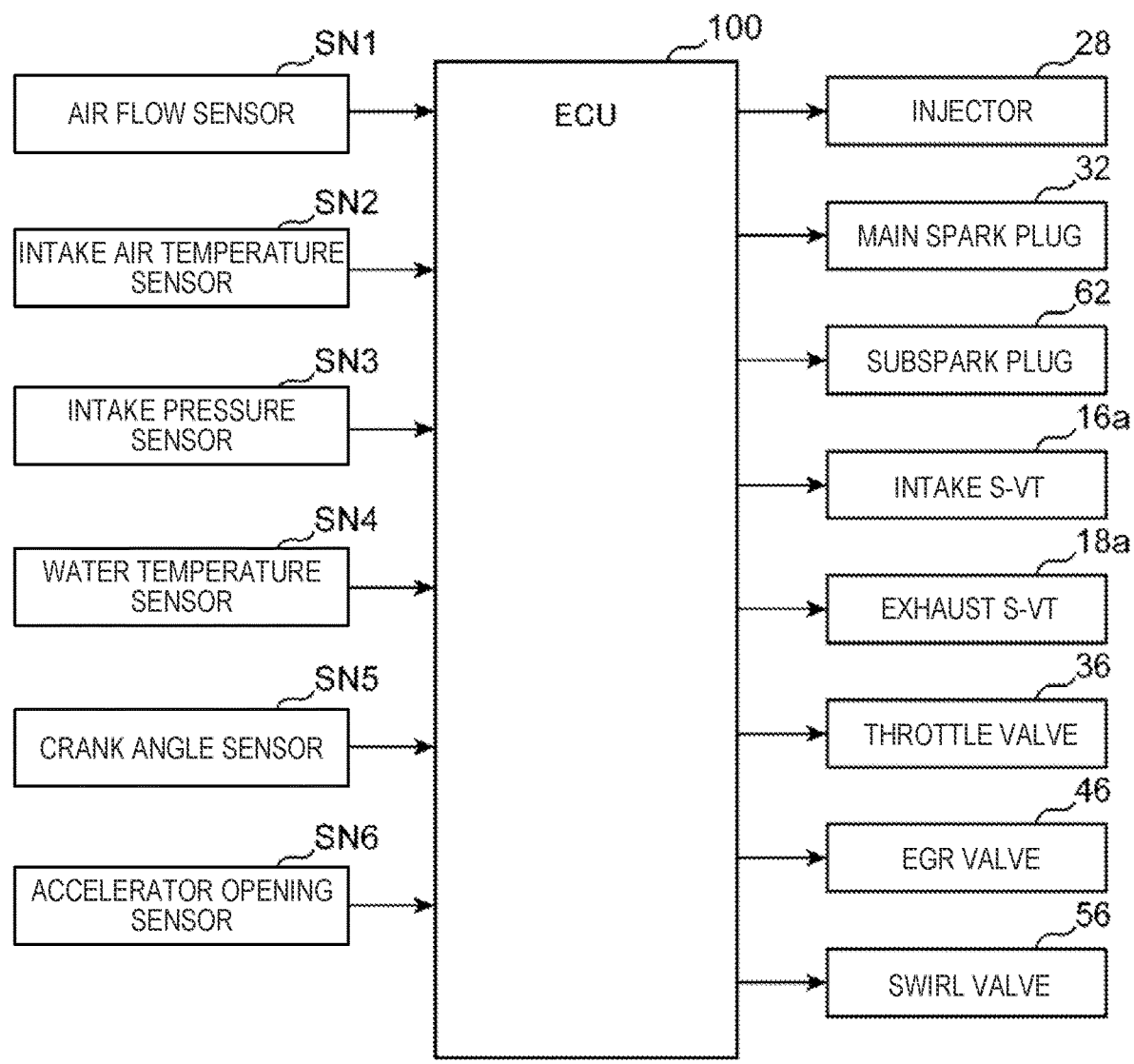
FIG. 5 is a view illustrating a control block of the engine.

FIG. 5 is a block diagram illustrating a control system of the engine. An electronic control unit (ECU) 100 illustrated in the figure is a device which comprehensively controls the engine, and is comprised of a microcomputer including a processor (e.g., a central processing unit (CPU)) which performs various calculation processings, memory such as a ROM and a RAM, and various kinds of input and output buses. The ECU 100 is an example of a "control device" of the present disclosure.

Detection information by the various sensors are inputted into the ECU 100. For example, detection values, from an air flow sensor SN1, an intake air temperature sensor SN2, an intake pressure sensor SN3, a water temperature sensor SN4, and a crank angle sensor SN5, which are provided to the engine system 1, and from an accelerator opening sensor SN6 which is provided to the vehicle, are inputted into the ECU 100. The air flow sensor SN1 detects a flow rate of intake air which passes through the intake passage 4 and is introduced into the engine body 2. The intake air temperature sensor SN2 and the intake pressure sensor SN3 detect a temperature and a pressure of intake air introduced into the engine body 2, respectively. The water temperature sensor SN4 detects a temperature of engine coolant for cooling the engine body 2. The crank angle sensor SN5 detects a crank angle which is a turning angle of the crankshaft 20, and an engine speed. The accelerator opening sensor SN6 detects an accelerator opening which is an opening of an accelerator pedal (not illustrated) mounted on the vehicle.

The ECU 100 performs various determinations, calculations, etc. based on the input signals from the various sensors. The ECU 100 is electrically connected to the injector 28, the main spark plug 32, the subspark plug 62, the EGR device 50 (in detail, the EGR valve 46), etc., and outputs electric signals for control to these devices based on the calculation results, etc.

Figure 6:
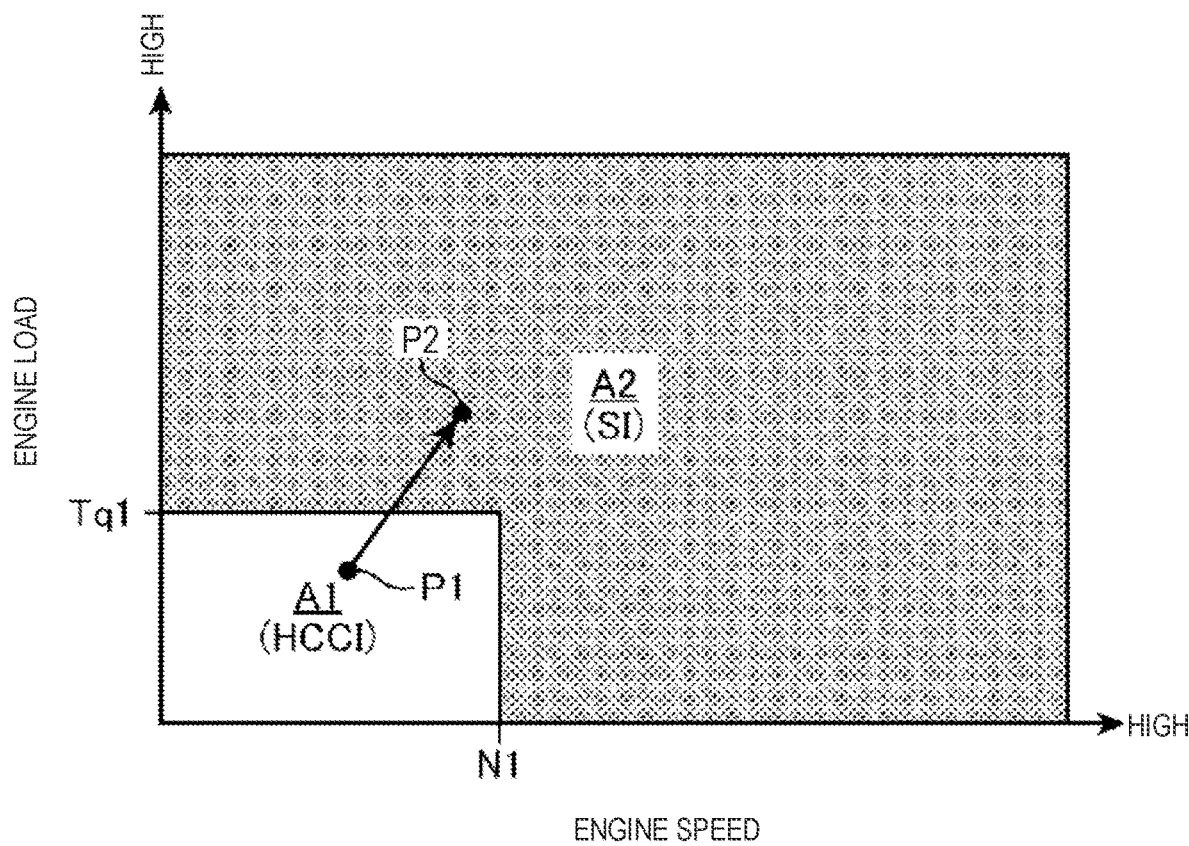
FIG. 6 is a map illustrating an operating range of the engine.

FIG. 6 is a map illustrating an operating range of the engine, where the horizontal axis is an engine speed and the vertical axis is an engine load. As illustrated in FIG. 6, the operating range of the engine is roughly divided into two ranges A1 and A2 (Homogeneous Compression Charge Ignition (HCCI) range A1 and spark ignition (SI) range A2) according to the combustion mode. The HCCI range A1 is a low-speed low-load range where the engine speed is below a given switch engine speed N1 and the engine load is below a given switch load Tq1, and the SI range A2 is a range other than the HCCI range A1. The HCCI range A1 is an example of a "first range" of the present disclosure, and the SI range A2 is an example of a "second range" of the present disclosure.

Normal Control

A normal control performed in each of the ranges A1 and A2 (a control when not being a transition from the HCCI range A1 to the SI range A2) is described.

HCCI Range

In the HCCI range A1, each part of the engine is controlled by the ECU 100 so that the mixture gas carries out compression self-ignition combustion.

In detail, in the HCCI range A1, the ECU 100 suspends the main ignition and the subignition. That is, the ECU 100 suspends the main spark plug 32 and the subspark plug 62 to inhibit the ignition (spark discharge) by these spark plugs 32 and 62.

Figure 7:
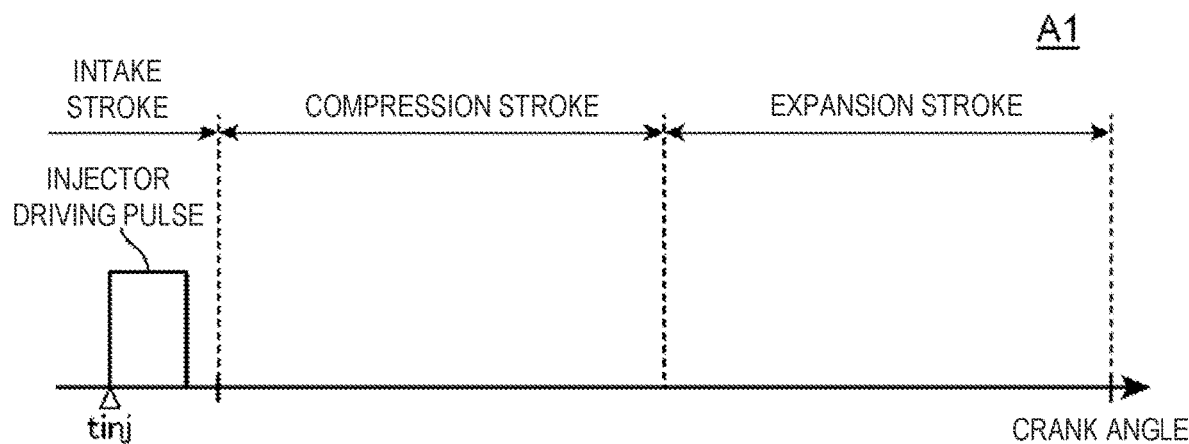
FIG. 7 is a view illustrating a driving pulse of an injector in a Homogeneous Compression Charge Ignition (HCCI) range.

FIG. 7 is a view illustrating a driving pulse of the injector 28 in the HCCI range A1. As illustrated in FIG. 7, in the HCCI range A1, the ECU 100 sets a fuel injection timing tinj which is a timing at which the fuel injection from the injector 28 is started to a timing in intake stroke so that the injector 28 starts the fuel injection from a given timing in the intake stroke.

As described above, the injector 28 faces the main combustion chamber 26 so that fuel injected from the injector 28 is diffusible to the entire main combustion chamber 26. Thus, in the HCCI range A1, since fuel is injected from the injector 28 in intake stroke, fuel is diffused substantially uniformly throughout the main combustion chamber 26 by the time it reaches a compression top dead center, and fuel is fully mixed with air. Then, in the HCCI range A1, this fully-mixed mixture gas (premixed mixture gas) self-ignites near the compression top dead center when it becomes high in the temperature and high in the pressure by the compression of the piston 24. Thus, in this embodiment, in the HCCI range A1, fuel is mixed beforehand with air to form inside the main combustion chamber 26 the mixture gas with a substantially uniform concentration (i.e., homogeneous mixture gas), and HCCI (Homogeneous Compression Charge Ignition) combustion where this mixture gas (premixed mixture gas) carries out the compression self-ignition combustion near the compression top dead center can be realized.

In the HCCI combustion, the air-fuel ratio of the mixture gas is made leaner (higher) to a level where flame propagation is impossible to improve fuel efficiency. Thus, in the HCCI range A1, the ECU 100 adjusts the opening of the throttle valve 36 so that the air-fuel ratio of the mixture gas inside the main combustion chamber 26 becomes leaner (higher) than the stoichiometric air-fuel ratio (14.7:1).

Further, in the HCCI range A1, the ECU 100 carries out EGR for recirculating EGR gas to the intake passage 4 and the main combustion chamber 26. That is, in the HCCI range A1, the EGR valve 46 is opened and the EGR gas is recirculated to the intake passage 4 and the main combustion chamber 26.

SI Range

In the SI range A2, each part of the engine is controlled by the ECU 100 so that the mixture gas carries out SI (Spark Ignition) combustion (that is, flame propagation combustion).

In detail, in the SI range A2, the ECU 100 carries out the main ignition and the subignition. That is, the ECU 100 activates the main spark plug 32 and the subspark plug 62 to make these spark plugs 32 and 62 ignite fuel (spark discharge). When the spark discharge by the spark plugs 32 and 62 is performed, a flame kernel is generated around electrode parts 32x and 62x of these spark plugs 32 and 62 so that the SI combustion in which the flame propagates from the flame kernel to the circumference can be realized.

Figure 8:
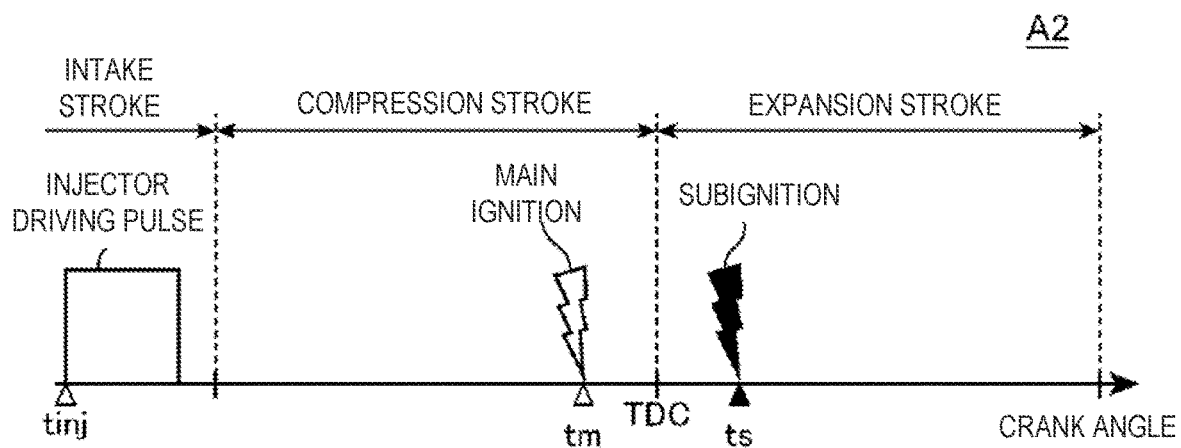
FIG. 8 is a view illustrating one example of a driving pulse of the injector, a main ignition timing, and a subignition timing in a spark ignition (SI) range.

FIG. 8 is a view illustrating a driving pulse of the injector 28 in the SI range A2, a main ignition timing tm which is an ignition timing of the main spark plug 32 (timing tm by the crank angle at which the main spark plug 32 carries out ignition (i.e., spark discharge)), and a subignition timing ts which is an ignition timing of the subspark plug 62 (timing ts by the crank angle at which the subspark plug 62 carries out ignition (i.e., spark discharge)).

As illustrated in FIG. 8, in the SI range A2, the ECU 100 sets the fuel injection timing tinj to a timing in intake stroke so that the injector 28 starts the fuel injection from a given timing in the intake stroke. Note that in a range of the SI range A2 where the engine speed is low, the engine load is high, and a preignition (a phenomenon in which the mixture gas self-ignites before ignition takes place) tends to occur, the fuel injection timing may be set to a timing in compression stroke in order to securely avoid the occurrence of the preignition.

As illustrated in FIG. 8, in the SI range A2, the ECU 100 sets the main ignition timing tm to a timing on the advance side of the subignition timing ts. That is, the ECU 100 first makes the main spark plug 32 ignite, and then makes the subspark plug 62 ignite. In this embodiment, the main ignition timing tm is set to the timing in compression stroke, and the subignition timing ts is set to the timing in expansion stroke.

In the SI range A2, the ECU 100 adjusts the opening of the throttle valve 36 so that the air-fuel ratio of the mixture gas inside the main combustion chamber 26 becomes the stoichiometric air-fuel ratio.

As described above, in the HCCI range A1, the air-fuel ratio of the mixture gas inside the main combustion chamber 26 is made leaner (higher) than the stoichiometric air-fuel ratio (14.7:1). Thus, the air-fuel ratio (second air-fuel ratio) of the mixture gas inside the main combustion chamber 26 in the SI range A2 is made lower (richer) than the air-fuel ratio (first air-fuel ratio) of the mixture gas inside the main combustion chamber 26 in the HCCI range A1. In other words, the ECU 100 controls the throttle valve 36 so that the air-fuel ratio in the main combustion chamber 26 in the SI range A2 becomes lower than the air-fuel ratio in the HCCI range A1.

Further, in the SI range A2, the ECU 100 adjusts the opening of the EGR valve 46 so that the EGR rate becomes smaller than the HCCI range A1. The EGR rate is a ratio (weight percentage) of EGR gas which occupies in all the gas existing in the main combustion chamber 26 and the subchamber 60. In this embodiment, in a range of the SI range A2 where the engine speed is high and the engine load is high, the EGR is suspended (the EGR valve 46 is fully closed) and the EGR rate becomes zero. On the other hand, in the remaining ranges of the SI range A2, the EGR rate becomes a value larger than zero so that the EGR valve 46 is opened.

Transition Control

Next, a control of the main spark plug 32 and the sub spark plug 62 carried out by the ECU 100, during the transition from the HCCI range A1 to the SI range A2 (i.e., when the operating point transits from the operating point P1 in the HCCI range A1 to the operating point P2 in the SI range A2 as illustrated by an arrow in FIG. 6), is described.

The ECU 100 performs a control which treats the subignition more preferentially than the main ignition when transiting from the HCCI range A1 to the SI range A2. In detail, during this transition, the ECU 100 performs a control selected from the following two patterns:

Pattern A: Performing only the subignition; and

Pattern B: Performing the subignition and the main ignition which is performed after the subignition (the subignition and the main ignition is performed, and the main ignition timing is set to the same timing as the subignition timing or a timing retarded from the subignition timing).

Below, a case where the control of "Pattern B" is performed is described.

Figure 9:
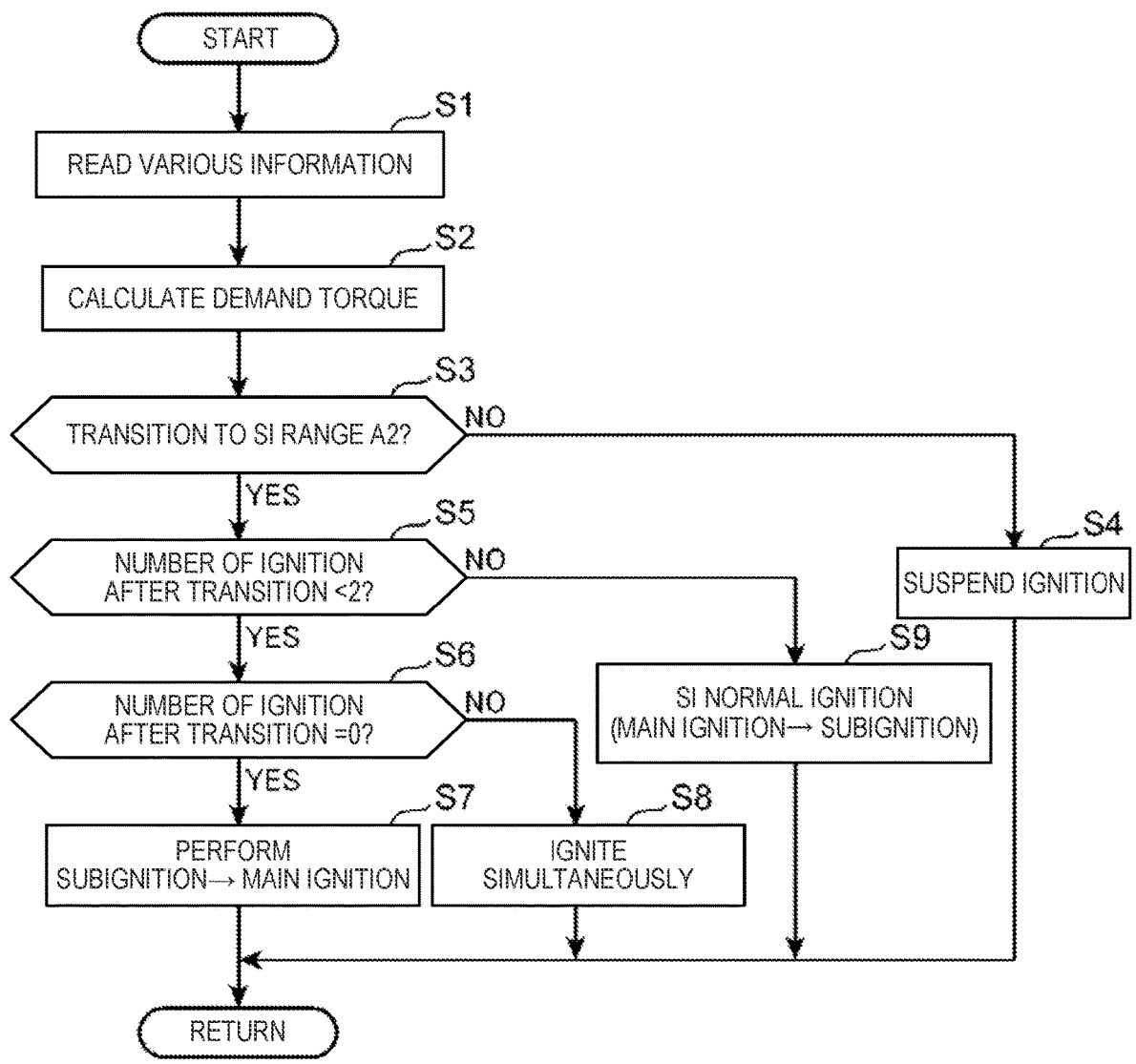
FIG. 9 is a flowchart illustrating a control procedure of a main spark plug and a subspark plug.

FIG. 9 is a flowchart illustrating a procedure of the spark plugs 32 and 62 when transiting from the HCCI range A1 to the SI range A2.

The ECU 100 first reads variety of information (Step S1). The ECU 100 reads the engine speed detected by the crank angle sensor SN5, the accelerator opening detected by the accelerator opening sensor SN6, etc.

Next, the ECU 100 calculates a demand torque which is a torque required for the engine (i.e., engine load) (Step S2). The ECU 100 calculates the demand torque (engine load) based on the engine speed and the accelerator opening which are read at Step S1.

Next, the ECU 100 determines whether the operating point of the engine transited from the HCCI range A1 to the SI range A2 (Step S3). In detail, if the current operating point of the engine is determined as a point within the SI range A2 based on the engine speed read at Step S1 and the demand torque (engine load) calculated at Step S2, the ECU 100 determines that a transition from the HCCI range A1 to the SI range A2 takes place.

If the determination at Step S3 is NO where the transition of the operating point from the HCCI range A1 to the SI range A2 does not take place, that is, if the present operating point is a point within the HCCI range A1, the ECU 100 controls the spark plugs 32 and 62 in the normal HCCI range A1 described above. In detail, the ECU 100 suspends the ignition by the main spark plug 32 and the sub spark plug 62 (Step S4). On the other hand, if the determination at Step S3 is YES and the operating point of the engine transited from the HCCI range A1 to the SI range A2, the ECU 100 transits to Step S4.

The ECU 100 determines whether the number of ignitions after the transition from the HCCI range A1 to the SI range A2 takes place is less than twice (Step S5). That is, the ECU 100 determines whether it is either a state where the ignition has not yet been performed after the transition to the SI range A2 (the number of ignitions is zero) or a state where the ignition has been performed only once after the transition to the SI range A2 (the number of ignitions is once). The number of ignitions is the number of ignitions by the main spark plug 32 or ignitions by the sub spark plug 62, and it is the same as the number of combustion cycles. Further, the number of ignitions (i.e., the number of combustion cycles) is the number for one cylinder 22, and in this embodiment where the plurality of cylinders 22 are provided to the engine body 2, the ECU 100 determines whether the number of ignitions is less than twice, for every cylinder 22. Further, the ECU 100 also carries out the steps after Step S5 (Steps S6-S9) individually for every cylinder 22.

If the determination at Step S5 is YES and the number of ignitions after the transition to the SI range A2 is less than twice, the ECU 100 further determines whether the number of ignitions after the transition to the SI range A2 is zero, that is, whether the ignition has not yet been performed after the transition to the SI range A2 (Step S6).

If the determination at Step S6 is YES and the number of ignitions after the transition to the SI range A2 is zero, the ECU 100 first makes the subspark plug 62 ignite (subignition), and then makes the main spark plug 32 ignite (main ignition) (Step S7). That is, after the transition to the SI range A2, in the first ignition (combustion cycle) in the SI range A2 carried out for each cylinder 22, the ECU 100 first activates the subspark plug 62 to perform the ignition (spark discharge), and then activates the main spark plug 32 to perform the ignition (spark discharge). Note that when Step S7 is carried out, the number of ignitions becomes 1 from 0.

Figure 10A:
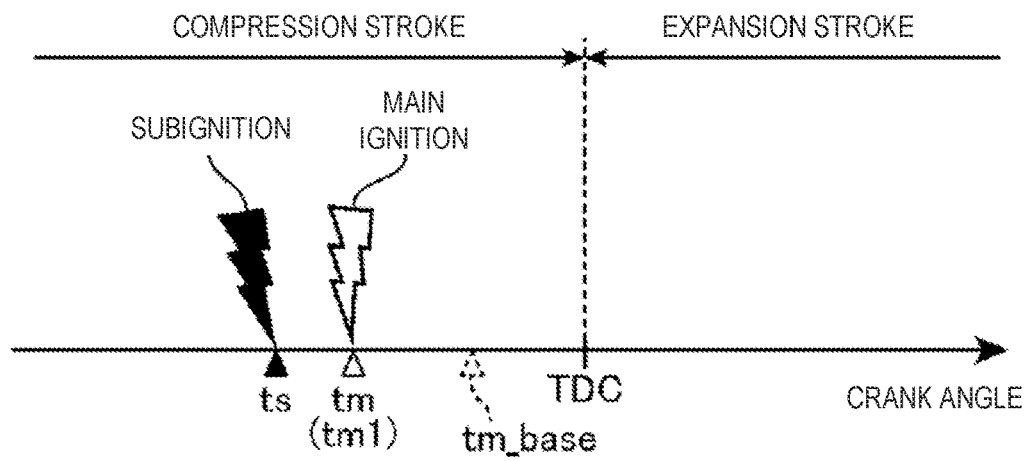
FIGS. 10A to 10C illustrate examples of the main ignition timing and the subignition timing at the transition from the HCCI range to the SI range, where

FIG. 10A is a view illustrating the main ignition timing tm (timing tm1) and the subignition timing ts when the ignition is performed for the first time after the transition to the SI range A2 (the first combustion cycle after the transition). As illustrated in FIG. 10A, as for the first ignition after the transition, both the subignition timing ts and the main ignition timing tm are timings in compression stroke. A timing tm_base illustrated by a broken line in FIG. 10A is the main ignition timing tm at the time of the normal control in the SI range A2. As for the first ignition after the transition to the SI range A2, both the main ignition timing tm and the subignition timing ts are times on the advance side of the main ignition timing tm and the subignition timing ts for the normal control.

Returning to FIG. 9, if the determination at Step S6 is NO where the number of ignitions after the transition to the SI range A2 is not 0 time but is 1 time (i.e., the ignition has already been performed once after the transition), the ECU 100 makes the subspark plug 62 and the main spark plug 32 ignite simultaneously (subignition and main ignition) (Step S8). That is, as for the second ignition in the SI range A2 carried out for each cylinder 22 after the transition to the SI range A2, the ECU 100 activates the subspark plug 62 and the main spark plug 32 simultaneously to make them ignite (spark discharge) simultaneously. Note that when Step S8 is carried out, the number of ignitions becomes twice from once.

Figure 10B:
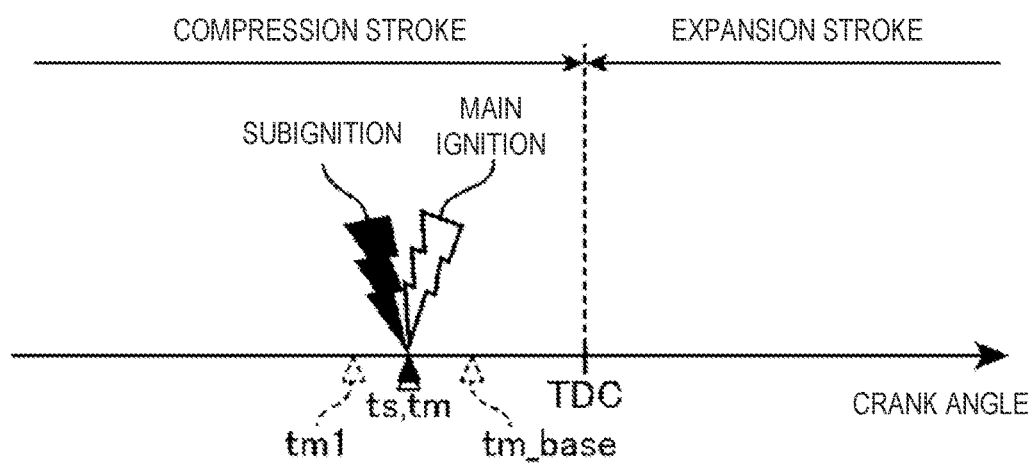

FIG. 10B is a view illustrating the main ignition timing tm and the subignition timing ts when the ignition is performed for the second time after the transition to the SI range A2 (in the second combustion cycle after the transition). As illustrated in FIG. 10B, as for the first ignition after the transition, both the subignition timing ts and the main ignition timing tm are timings in compression stroke. Similar to FIG. 10A, the timing tm_base illustrated by a broken line in FIG. 10B is the main ignition timing tm at the time of the normal control in the SI range A2. A timing tm1 illustrated by a chain line in FIG. 10B is the main ignition timing tm in the first ignition illustrated in FIG. 10A. It is apparent from a comparison between these timings tm1 and tm_base that, as for the second ignition after the transition to the SI range A2, both the main ignition timing tm and the subignition timing ts are made to timings on the advance side of the main ignition timing tm (tm_base) at the time of the normal control, and is made to timings on the retard side of the first main ignition timing tm1 after the transition.

Figure 10C:
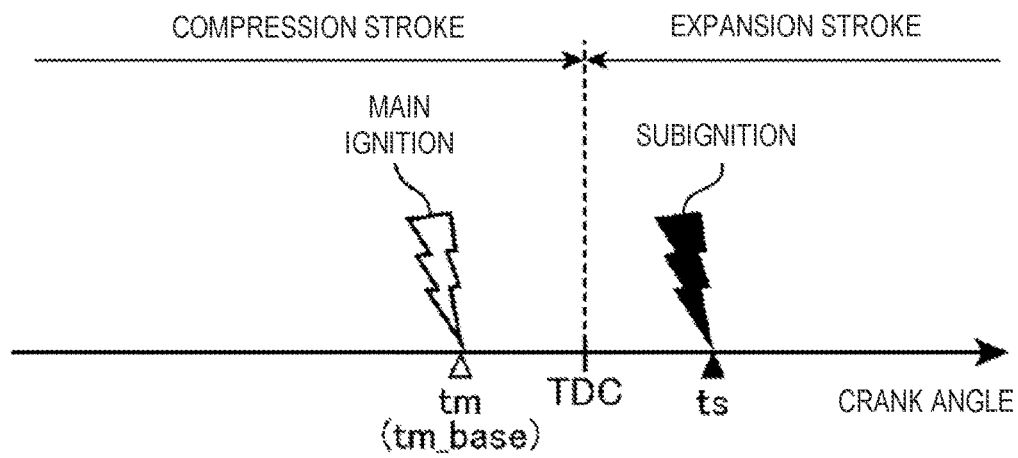

Returning to Step S5, if the determination at Step S5 is NO and the number of ignitions after the transition to the SI range A2 is twice or more, the ECU 100 performs the normal control to the spark plugs 32 and 62 (Step S9). That is, when the ignition is carried out twice after the transition to the SI range A2, the ECU 100 starts the normal control. FIG. 10C is a view illustrating the main ignition timing tm and the subignition timing ts when the ignition is performed for the third time and the subsequent times after the transition to the SI range A2 (in the third and subsequent combustion cycles after the transition), and is a view illustrating a part of FIG. 8. As illustrated in these drawings, and as described above, in the normal control carried out for the third and subsequent times after the transition to the SI range A2, the ECU 100 sets the main ignition timing tm on the advance side of the subignition timing ts. Further, the ECU 100 sets the main ignition timing tm at a timing in compression stroke, and sets the subignition timing ts at a timing in expansion stroke.

Figure 11:
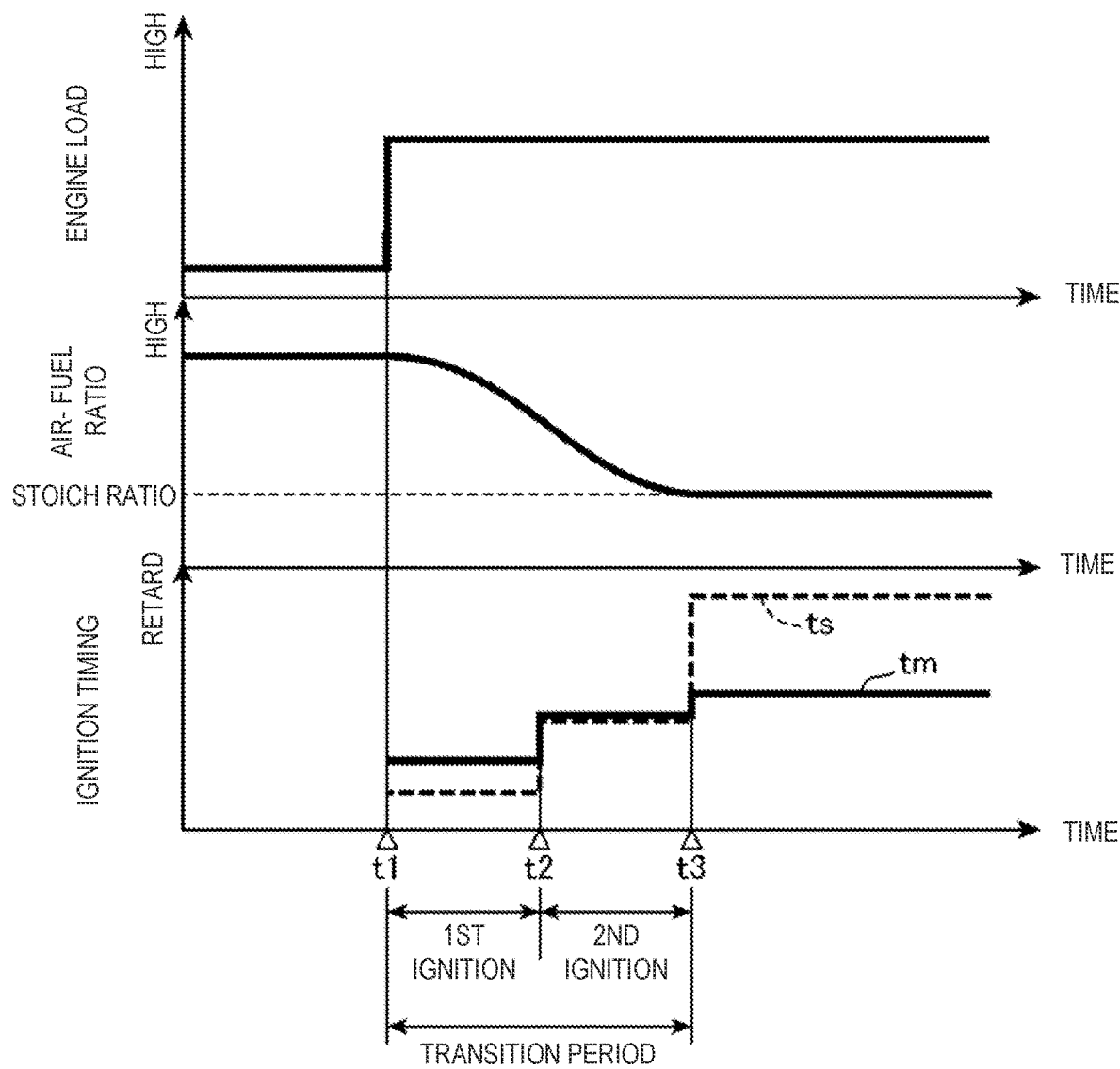
FIG. 11 a time chart illustrating a temporal change in each parameter when transiting from the HCCI range to the SI range.

FIG. 11 is a time chart illustrating a temporal change in each parameter when transiting from the HCCI range A1 to the SI range A2. In FIG. 11, sequentially from the top, charts of the engine load, the air-fuel ratio in the main combustion chamber 26, and the ignition timing (the main ignition timing tm and the subignition timing ts) are illustrated.

In the example of FIG. 11, at a time t1, the engine load increases, and the operating point of the engine transits from the point within the HCCI range A1 to the point within the SI range A2.

In response to the transition to the SI range A2, the spark plugs 32 and 62 are activated at the time t1. As described above, the order of ignition first performed after the transition to the SI range A2 is subignition then main ignition, and the subignition timing ts is advanced from the main ignition timing tm from the time t1 until the subignition and the main ignition for the first time are finished for all the cylinders 22.

In the example of FIG. 11, the first ignition (the subignition and the main ignition) is finished for all the cylinders 22 at a time t2, and the second ignition is started at the time t2. As for the ignition performed for the second time after the transition to the SI range A2, the subignition and the main ignition are carried out simultaneously, and the subignition timing ts and the main ignition timing tm are the same timing from the time t2 until the second subignition and the second main ignition are finished for all the cylinders 22. Further, as described above, the subignition timing ts and the main ignition timing tm are set on the retard side for the second time more than for the first time, and at the time t2, these ignition timings ts and tm are retarded from a timing before the time t2.

In the example of FIG. 11, the second ignition (the subignition and the main ignition) is finished for all the cylinders 22 at a time t3, and the third ignition is started at the time t3. As described above, the control of the spark plugs 32 and 62 after the third ignition becomes the normal control, and after the time t3, the order of ignition becomes main ignition then subignition. Further, as described above, the subignition timing ts and the main ignition timing tm are set on the retard side during the normal control more than during the first ignition and the second ignition, and at the time t3, these ignition timings ts and tm are retarded from timings before the time t3.

Further, during operation in the HCCI range A1 until the time t1, the air-fuel ratio is made leaner than the stoichiometric air-fuel ratio. Then, when the operating point transits to a point within the SI range A2 at the time t1, the opening of the throttle valve 36 is changed so that the air-fuel ratio becomes the stoichiometric air-fuel ratio. In detail, the opening of the throttle valve 36 is changed to the opening on the closing side. Further, the opening of the EGR valve 46 is adjusted so that the EGR rate becomes smaller. Note that there is a delay in the intake air and the EGR gas. Therefore, even if the openings of the throttle valve 36 and the EGR valve 46 are changed at the time t1, the air-fuel ratio inside the main combustion chamber 26 does not immediately drop to the stoichiometric air-fuel ratio. Thus, for a while after the time t1, the air-fuel ratio inside the main combustion chamber 26 becomes in the state higher (leaner) than the stoichiometric air-fuel ratio, and near the time t3, the air-fuel ratio inside the main combustion chamber 26 falls to the stoichiometric air-fuel ratio for the first time.

Operation, Etc.

As described above, in the engine system 1 of this embodiment, the HCCI combustion is carried out in the low-speed low-load HCCI range A1. Further, in the SI range A2 which is comprised of other ranges, the mixture gas combusts (flame propagation combustion) in both the main combustion chamber 26 and the subchamber 60. Therefore, fuel efficiency can be improved in all the ranges, and fuel efficiency of the engine system 1 can be improved securely.

Here, immediately after the transition to the SI range A2, it is difficult to carry out the flame propagation combustion of the mixture gas inside the main combustion chamber 26 only by the spark discharge from the main spark plug 32. Thus, in the case where it is in the normal ignition control in the SI range A2 immediately after the transition, when a control in which the main spark plug 32 is first activated and the subspark plug 62 is then activated, the engine torque may decrease and the torque shock may occur.

In detail, although the main spark plug 32 is activated to maintain its temperature and the temperature around the main spark plug 32 at a comparatively high temperature in the SI range A2, since the main spark plug 32 is suspended (deactivated) in the HCCI range A1, the temperature of the main spark plug 32 and its circumference can be kept low. Further, since the main combustion chamber 26 communicates with the intake passage 4 via the intake port 8 and it also communicates with the exhaust passage 6 via the exhaust port 12, it is difficult for burnt gas to remain inside the main combustion chamber 26 and for the main combustion chamber 26 to be kept warm by hot burnt gas. As illustrated in FIG. 11, the air-fuel ratio is maintained high immediately after the transition from the HCCI range A1 to the SI range A2. Thus, even if the control in which the main spark plug 32 is first activated immediately after the transition to the SI range A2 is performed, the flame kernel is not appropriately formed around the main spark plug 32, and therefore, the mixture gas inside the main combustion chamber 26 may not combust appropriately.

On the other hand, in this embodiment, upon the first ignition after the transition from the HCCI range A1 to the SI range A2, the firing order is subignition then main ignition so that the ignition is first performed to the mixture gas inside the subchamber 60 by the subspark plug 62, and the ignition by the main spark plug 32 is then performed. Therefore, the flame propagation combustion of the mixture gas inside the main combustion chamber 26 can be carried out securely, and the decrease in the engine torque can be suppressed.

In detail, the subchamber 60 is divided from the main combustion chamber 26 by the cover member 64, and communicates with the main combustion chamber 26 only via the communicating holes 66. Thus, hot burnt gas is easy to remain inside the subchamber 60, and the subchamber 60 is kept warm by hot burnt gas also in the HCCI range A1. Therefore, even if it is immediately after the transition from the HCCI range A1 to the SI range A2, the flame propagation combustion of the mixture gas can be carried out in the subchamber 60 by the spark discharge of the sub spark plug 62. Therefore, according to this embodiment, since the ignition by the sub spark plug 62 is first performed upon the first ignition after the transition to the SI range A2, the flame propagation combustion of the mixture gas inside the subchamber 60 can be carried out to blow off the flame from the subchamber 60 into the main combustion chamber 26, and therefore, the flame propagation combustion of the mixture gas inside the main combustion chamber 26 can be started. Further, since the ignition by the main spark plug 32 is performed after the subspark plug 62, ignition energy can be added from the main spark plug 32 to the mixture gas inside the main combustion chamber 26 which became hot by receiving the flame blown off from the subchamber 60, and therefore, the flame propagation combustion of the entire mixture gas inside the main combustion chamber 26 can be carried out securely.

Here, upon the second ignition after the transition to the SI range A2, although the air-fuel ratio of mixture gas inside the main combustion chamber 26 is not fully dropped but is sufficiently low, and therefore, the mixture gas inside the main combustion chamber 26 is in the state where it is comparatively easy to combust compared with the first ignition. Therefore, when the ignition is performed in the order of subignition then main ignition similar to the first ignition, since the ignition energy is added from the main spark plug 32 to the mixture gas inside the main combustion chamber 26 which became hot by receiving the flame from the subchamber 60, the mixture gas inside the main combustion chamber 26 may combust explosively. On the other hand, in this embodiment, upon the second ignition after the transition to the SI range A2, the subignition and the main ignition are performed simultaneously. Therefore, the flame propagation combustion of the mixture gas inside the main combustion chamber 26 can be carried out securely, and the explosive combustion of the mixture gas inside the main combustion chamber 26 can be prevented.

MODIFICATIONS

Although in the above embodiment the subignition is carried out before the main ignition upon the first ignition after the transition from the HCCI range A1 to the SI range A2, the main ignition and the subignition may be performed simultaneously also for the first ignition, similar to the second ignition. Also in this case, since the mixture gas inside the main combustion chamber 26 carries out the flame propagation combustion securely by the flame blown off from the subchamber 60 to the main combustion chamber 26, the decrease in the engine torque is suppressed. Note that, as described above, if the subignition is carried out before the main ignition, since the ignition energy is given from the main spark plug 32 to the mixture gas which is warmed by the flame blown off from the subchamber 60 to the main combustion chamber 26, the flame propagation combustion of the mixture gas inside the main combustion chamber 26 can be carried out more securely.

Further, although the control of "Pattern B" is carried out upon the transition from the HCCI range A1 to the SI range A2, the flame propagation combustion of the mixture gas inside the main combustion chamber 26 can be carried out securely by the flame blown off from the subchamber 60 to the main combustion chamber 26 also in the control of "Pattern A" (only the subignition is performed), and therefore, the decrease in the engine torque can be suppressed. Note that when the control of "Pattern A" is performed, the main spark plug 32 is suspended (deactivated) and the ignition is performed only by the subspark plug 62 upon the first ignition and the second ignition after the transition.

Further, in the above embodiment, in the HCCI range A1 which is the low-speed low-load range, the HCCI combustion is carried out, that is, the mixture gas carries out the compression self-ignition combustion in the state where the fuel injection is started in intake stroke and the air-fuel ratio of the mixture gas inside the main combustion chamber 26 is made leaner than the stoichiometric air-fuel ratio. However, the combustion carried out in the low-speed low-load range may not be a premixed compression self-ignition combustion, as long as it is compression self-ignition combustion. That is, the timing at which the fuel injection is started in the low-speed low-load range is not limited to the timing in intake stroke. Further, the range where the compression self-ignition combustion is carried out is not limited to the low-speed low-load range.

Further, the normal ignition control in the SI range A2 is not limited to the above control. For example, as the normal ignition control in the SI range A2, a control in which only the subignition is carried out or a control in which the subignition is carried out before the main ignition may be adopted.

The concrete shape and size of the cover member 64 of the subignition unit 30 are not limited to the above configuration. Further, the number and size of the communicating holes 66 formed in the cover member 64 are not limited to the above configuration. Moreover, the attached position of the subignition unit 30 is not limited to the above position. For example, the subignition unit 30 may be provided to the intake port 8 side with respect to the tip-end part 28x of the injector 28.

Further, the detailed structure, such as the number of cylinders of the engine body 2, is not limited to the above structure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
2 Engine Body
4 Intake Passage
24 Piston
28 Injector
26 Main Combustion Chamber
30 Subignition Unit
32 Main Spark Plug
36 Throttle Valve
52 Cylinder Block
54 Cylinder Head
60 Subchamber
62 Sub spark Plug
64 Cover Member (Partition)
66 Communicating Hole
100 ECU (Control Device)

What is claimed is:
1. An engine system, comprising:
a cylinder block and a cylinder head that form a cylinder;
a piston reciprocatably accommodated in the cylinder;

a main combustion chamber defined by the cylinder block, the cylinder head, and the piston;

a subchamber that is separated from the main combustion chamber by a partition, and communicates with the main combustion chamber through a communicating hole formed in the partition;

an injector that injects fuel into the main combustion chamber;

a main spark plug that performs a main ignition for igniting a mixture gas inside the main combustion chamber;

a subspark plug that performs a subignition for igniting the mixture gas inside the subchamber;

a throttle valve that changes an air-fuel ratio of the mixture gas inside the main combustion chamber; and a control device that is electrically connected to, and outputs an electric signal for control to, the injector, the main spark plug, the subspark plug, and the throttle valve, the control device being configured to:

when the engine operates in a given first range, suspend the main ignition and the subignition to carry out compression self-ignition combustion of the mixture gas inside the main combustion chamber, and control the throttle valve so that the air-fuel ratio inside the main combustion chamber becomes a given first air-fuel ratio;

when the engine operates in a second range adjacent to the first range, control at least one of the main spark plug and the subspark plug to perform the ignition to carry out flame propagation combustion of the mixture gas inside the main combustion chamber, and control the throttle valve so that the air-fuel ratio inside the main combustion chamber becomes a second air-fuel ratio lower than the first air-fuel ratio; and immediately after a transition from the first range to the second range, control only the subspark plug to perform the ignition, or control the subspark plug and the main spark plug to perform the ignitions and set a timing of the main ignition to a timing same as or retarded from the subignition, wherein the control device controls the subspark plug and the main spark plug so that the timing of the subignition is earlier than the timing of the main ignition in a first combustion cycle after the transition from the first range to the second range;

wherein the second air-fuel ratio is set to a value higher than a stoichiometric air-fuel ratio;

wherein in the first range, the control device controls the injector so that the fuel injection begins in intake stroke; and wherein the main spark plug is attached so that an electrode part thereof is located on an intake port side in a ceiling surface of the main combustion chamber, and the subspark plug is attached to a position on an exhaust port side in the ceiling surface of the main combustion chamber.

2. The engine system of claim 1, wherein the control device controls the subspark plug and the main spark plug to perform the ignitions simultaneously in a second combustion cycle after the transition from the first range to the second range.

3. The engine system of claim 2, wherein the control device controls the subspark plug and the main spark plug so that the timing of the subignition is later than the timing of the main ignition in a third combustion cycle and subsequent combustion cycles after the transition from the first range to the second range.

4. The engine system of claim 1, wherein the injector is disposed so that a tip-end part thereof is located at a center of the ceiling surface of the main combustion chamber.

* * * * *